June 20, 1967 SUNAO HIGASHIJIMA ET AL 3,326,075
APPARATUS FOR PREPARING EXPLOSIVES
Filed Nov. 4, 1965 7 Sheets-Sheet 2
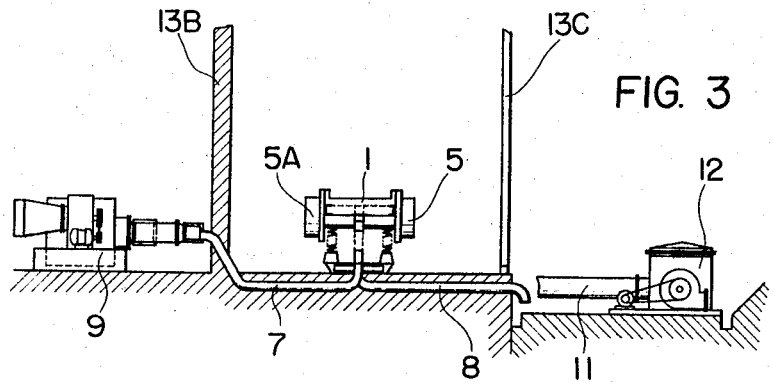
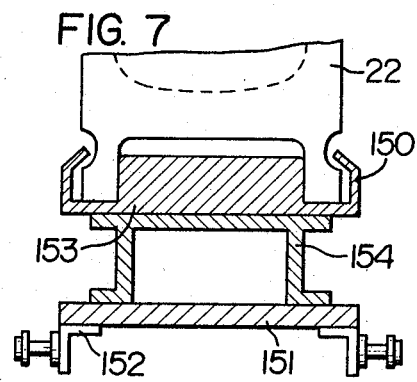

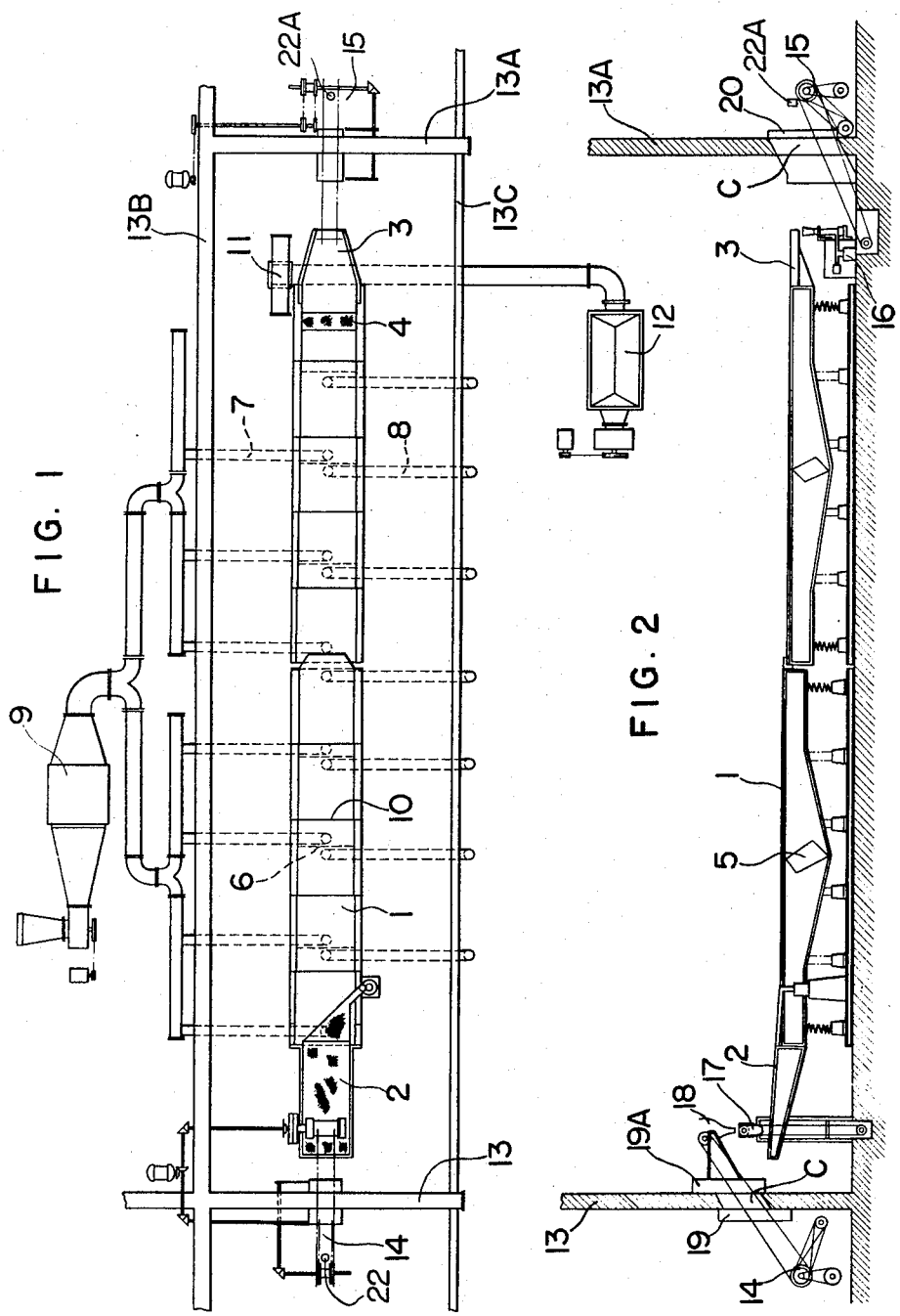

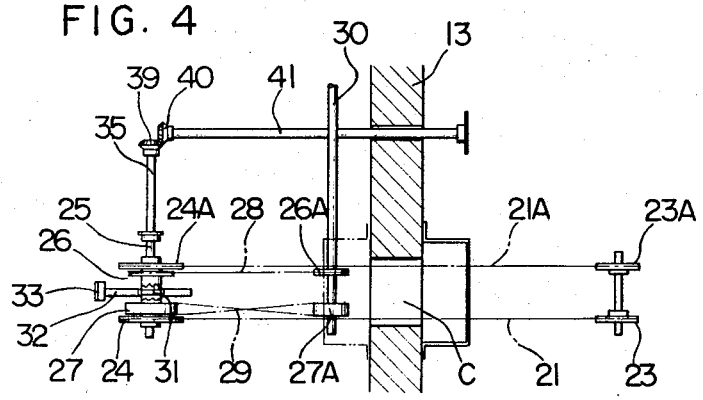
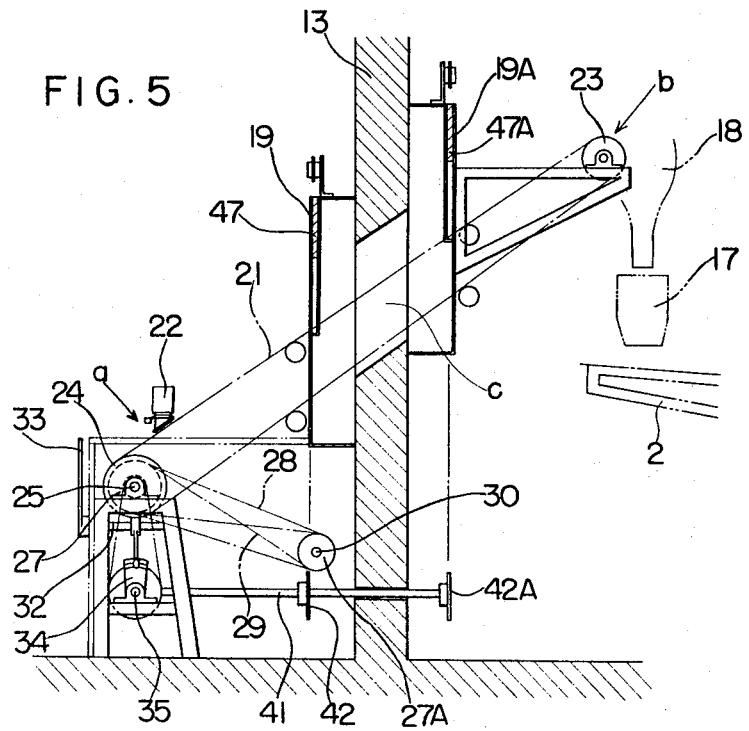

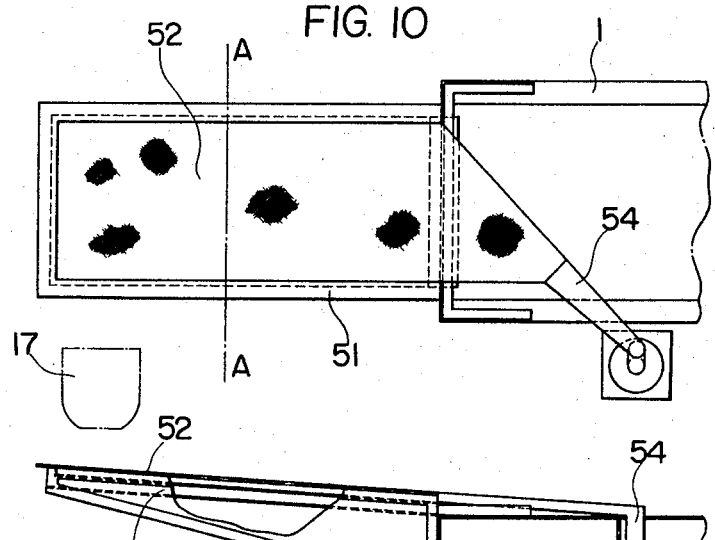
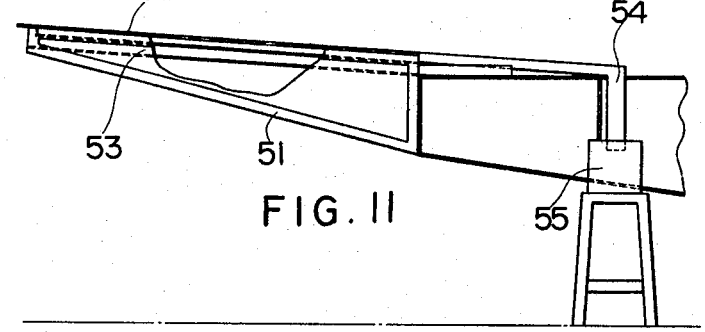
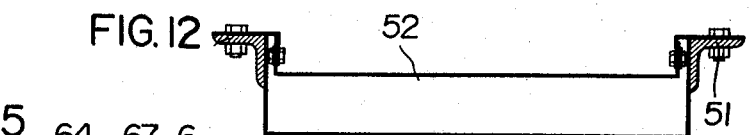
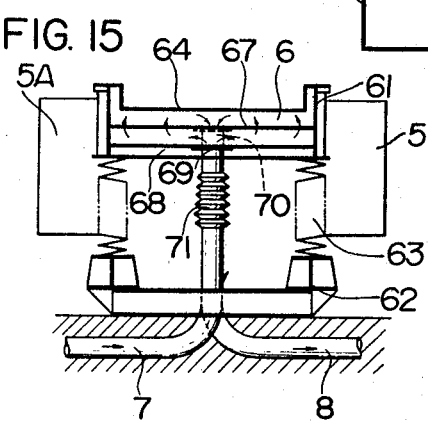
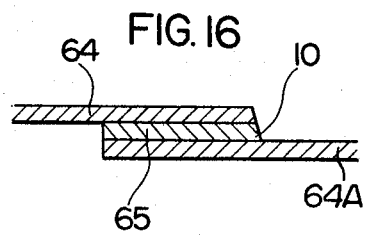

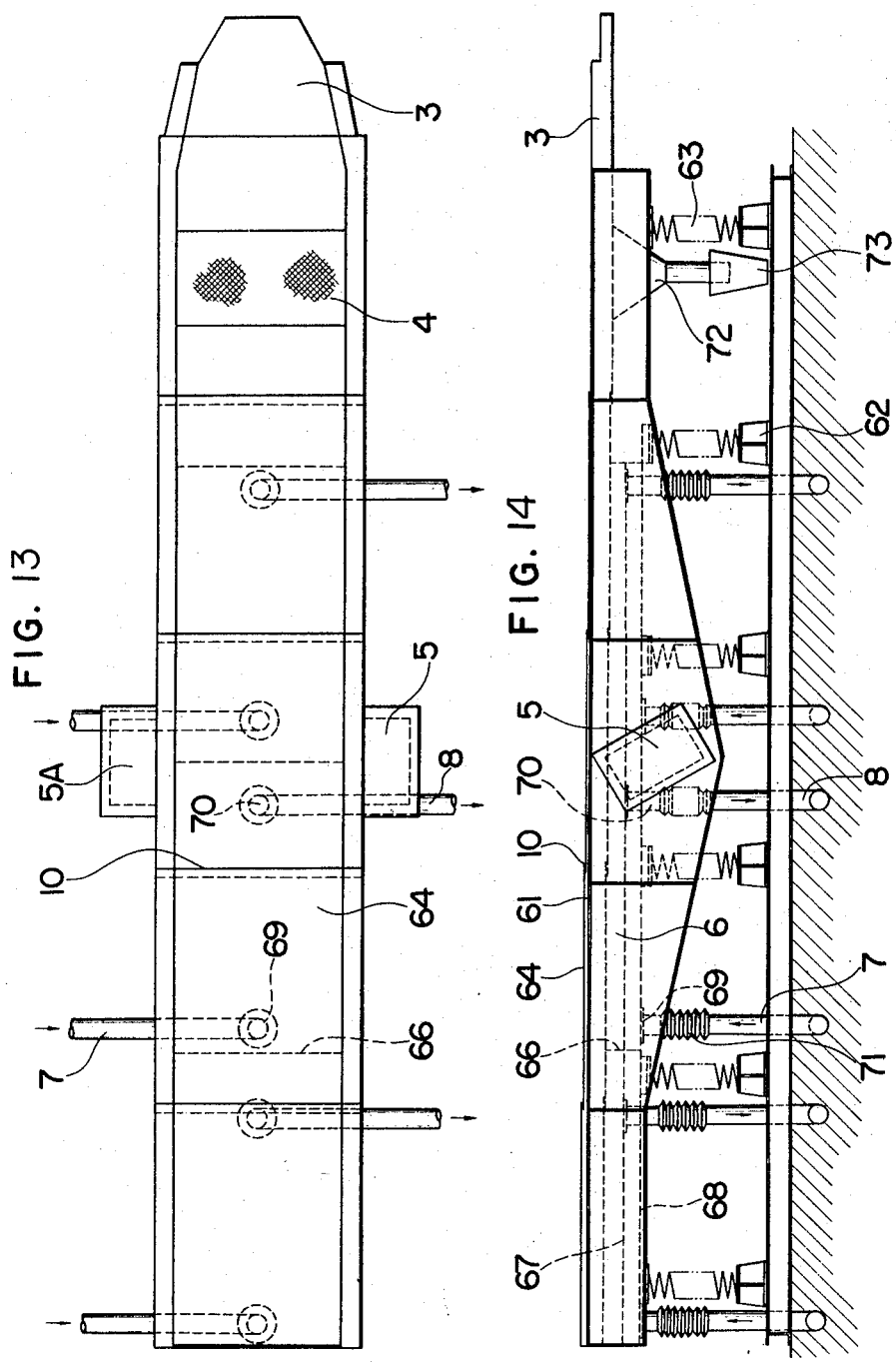

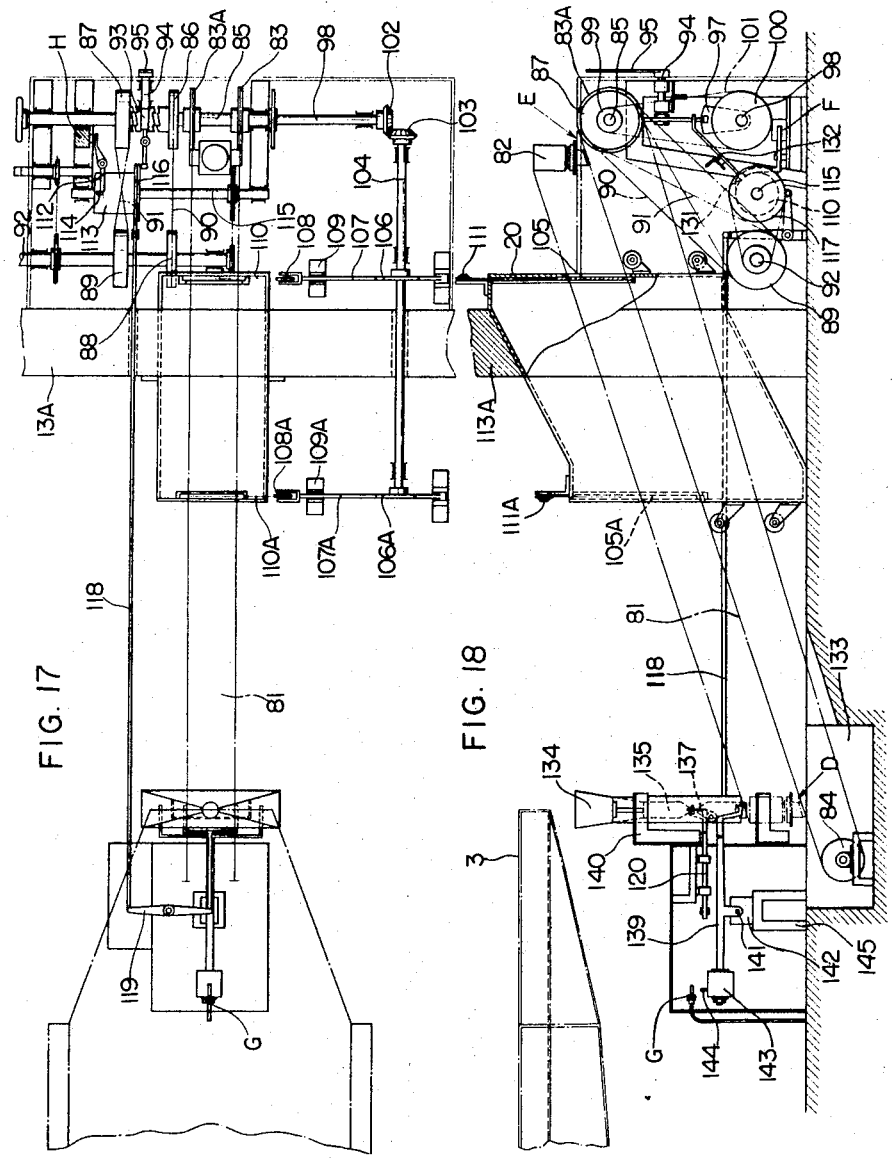

FIG. 19
FIG. 20
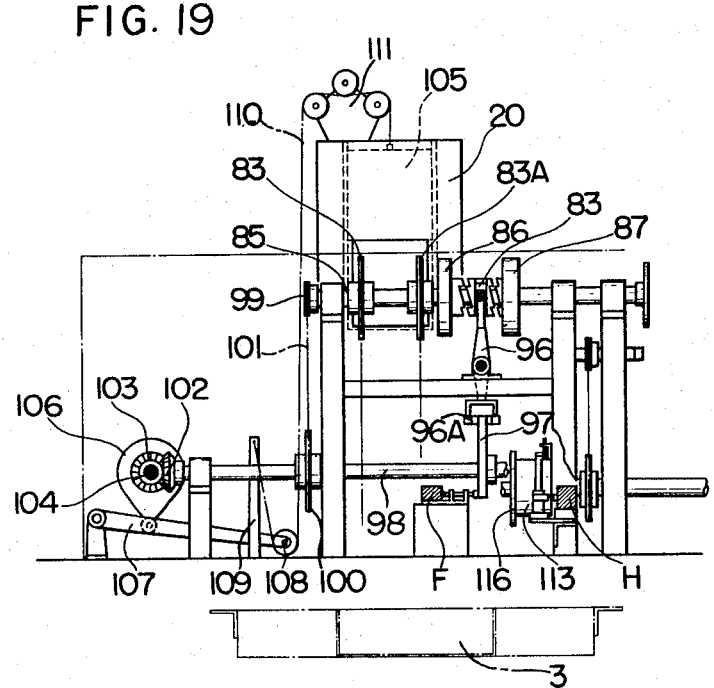
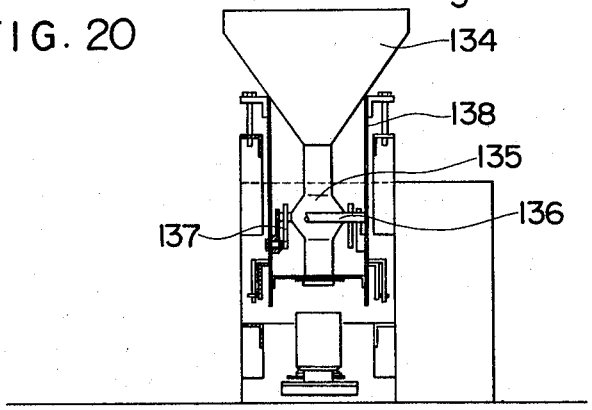

United States Patent Office 3,326,075
Patented June 20, 1967

3,326,075
APPARATUS FOR PREPARING EXPLOSIVES
Sunao Higashijima, Tokyo, and Masafumi Hamasaki, Nobeoka-shi, Japan, assignors to Asahi Kasei Kogyo Kabushiki Kaisha, Osaka, Japan, a corporation of Japan
Filed Nov. 4, 1965, Ser. No. 506,376
Claims priority, application Japan, Feb. 10, 1965, 40/7,071; Apr. 12, 1965, 40/21,170, 40/21,171
10 Claims. (Cl. 86—1)

This invention relates to an apparatus for preparing explosives, and more particularly to an apparatus for carrying out automatically granulation, drying, screening, weighing, and conveying of explosive material in the preparation of explosives.

Workers have heretofore directly handled a hazardous explosive material in their preparation of the explosives, particularly, initiating explosives. The workers, therefore, have been exposed to the hazard of accidental explosion. For example, in the granulation of the initiating explosives, the workers granulate the wet initiating explosives from the dehydration step by pressing it on a wiremesh, with a rubber spatula. However, this is still hazardous even though the initiator is in a wet state. Furthermore, in the drying step the granulated explosives must be spread on a paper sheet and air-dried. After the evaporation of a definite amount of water, the granulated explosives are transferred onto another paper sheet, and disposed in a drying chamber, followed by drying. However, the work is not only complicated and inefficient but also very hazardous, because the workers often directly handle the initiating explosives. The screening step where the initiating explosives are sieved to a specific granularity, and the weighing step where the initiating explosives are weighed and encased in a container are even more hazardous, and thus must be carried out with much care, because the initiating explosives to be handled are in a dry state. Consequently, the working efficiency has been very low. On the other hand, each operation must be carried out in separate working rooms completely isolated from each other by an explosion-resistant wall or a pile of sandbags to prevent a sympathetic detonation. Accordingly, the initiating explosives to be handled must be conveyed through individual working rooms by means of a carrier vehicle and the like. However, in the conveying operation, the amount conveyed at one time is restricted to prevent the hazard of a great explosion, and the conveying operation itself must be carefully performed, resulting in poor efficiency. Furthermore, such conventional operating procedures present the great hazard of explosion.

An object of the present invention is to provide an apparatus for preparing the explosives by mechanically and automatically carrying out the granulation, drying, screening, weighing, and for conveying the explosives through these operations and particularly the initiating explosives. A further object of the present invention is to provide a safe and efficient apparatus for preparing the explosives, in which the above-mentioned drawbacks are completely eliminated.

To attain the above objects, a vibrating conveyor is employed in the apparatus for preparing the explosives of the present invention, as a means for drying, screening and conveying. That is to say, a plurality of hot air boxes are provided at the lowest part of the vibrating conveyor, to which hot air is supplied to keep the surface of the conveyor at a definite temperature. The conveyor, thus serves as a drying conveyor. Furthermore, a preliminary conveyor is provided at one end with a mesh screen for removing coarse grains and a plate therebelow, and at the other end with a mesh screen for removing fine powders, whereby screening of powders is effected. An exhausting pipe is provided adjacent the fine powder mesh screen to suck a very small amount of scattered powdery explosive. The explosive is conveyed under drying from one end to another of said conveyor owing to the vibration of the vibrating conveyor. The said vibrating conveyor is placed in a working room isolated by partition walls, and an explosive-feeding means serves to supply wet explosive through one partition wall to the conveyor whereas an explosive-discharging means serves to discharge the dry explosive through an other partition wall. Provided at the explosive-discharging means is a weighing means, whereby the screened dry explosive continuously discharged from one end of the vibrating conveyor is weighed to a specified amount, and encased in a container. When granulation is required, a granulator is provided between the explosive-feeding means and the vibrating conveyor, whereby the supplied explosive is granulated and discharged onto the conveyor.

The invention will next be described in conjunction with the attached drawing, wherein:

FIGURE 1 is a plan view showing the overall apparatus for preparing the explosives of the present invention;
FIGURE 2 is a side view thereof;
FIGURE 3 is a front view thereof;
FIGURE 4 is a plan view showing an explosive-feeding means;
FIGURE 5 is a side view thereof;
FIGURE 6 is a front view thereof;
FIGURE 7 is a sectional side view showing the engaging and disengaging mechanism of a chain conveyor and a container base;
FIGURE 8 is a plan view thereof;
FIGURE 9 is a view showing a structure for engaging the container securing means;
FIGURE 10 is a plan view showing a preliminary conveyor;
FIGURE 11 is a side view thereof;
FIGURE 12 is a sectional view along the line A—A in FIGURE 10;
FIGURE 13 is a plan view showing a drying conveyor;
FIGURE 14 is a side view thereof;
FIGURE 15 is a sectional view thereof;
FIGURE 16 is an enlarged sectional view showing the joint of a drying conveyor;
FIGURE 17 is a plan view showing an explosive-discharging mechanism;
FIGURE 18 is a side view showing a section thereof;
FIGURE 19 is a front view thereof; and
FIGURE 20 is a front view showing an explosive-weighing means in the said mechanism.

In the drawings, numeral 1 is a vibrating drying conveyor, one end of which is provided with a preliminary conveyor 2 having a mesh screen for screening the coarse grains, while at the other end there is provided a mesh screen 4 for screening the fine powders and a cooling plate 3. Two sizes of mesh screens may be provided one after the other at the preliminary conveyor 2 for screening and separating coarse grain and fine powder for rectifying the granulated explosive before the drying. The conveyors are subjected to vibration by the vibrating motors 5 and 5A provided at both sides of the drying conveyor 1. Owing to the vibration, the explosive fed is conveyed from one end of the vibrating conveyor, namely from the preliminary conveyor 2, to its other end, namely the cooling plate 3. During the period of said conveyance, the wet explosive is dried by means of the drying conveyor 1. That is to say, a plurality of hot air boxes 6 are provided independently from one another at the lower part of said conveyor so as to keep the surface of said conveyor always at a definite temperature, particularly a temperature between about 40° C. and 70° C. Each individual hot air box 6 has an air supplying duct 7 and an air exhausting duct 8. Numeral 9 is a hot air generating means connected to the air supplying duct 7, which supplies air at a definite temperature to the hot air boxes 6. According to the present invention, stages 10 are provided at spaced distances on the drying conveyor 1 to turn the conveyed explosive and thereby make the drying more effective. Numeral 11 is an exhausting pipe provided near the mesh screen 4, and connected to an exhausting apparatus 12. Therefore, the explosive fine powders scattered at the screening operation are sucked into the exhausting pipe 11, and thereby any danger of accidental explosion can be eliminated. The main part of the apparatus for preparing the explosives of the present invention, comprising the drying conveyor 1 and accessory means, as described above, is placed in a working room isolated by partition walls 13, 13A, 13B and 13C. An explosive-feeding means 14 is provided, in the present invention, to feed automatically the explosive onto the preliminary conveyor 2 from the outside of the partition wall 13, and on the other hand an explosive-discharging means 15 is provided to automatically discharge the dried explosive from the cooling plate 3 to the outside of the partition wall 13A, whereby no workers are required to enter the working room. Numeral 16 is an explosive-weighing means whereby the dry explosive continuously discharged from the end part of the cooling plate 3 is weighed and a specified amount to be encased in a container is delivered to the said explosive-discharging means 15. When the wet explosive is granulated and dried, a granulator 17 is provided between a hopper 18 provided at the explosive-feeding means 14, and the preliminary conveyor 2, whereby the wet explosive is granulated and discharged onto the preliminary conveyor 2. Numerals 19, 19A, and 20 are shielding means for the penetration holes c provided at the partition walls 13, and 13A. Numerals 22 and 22A show explosive-encasing containers.

FIGURES 4, 5 and 6 are a plan view, side view and front view showing details of the explosive-feeding means 14 as indicated in FIGURE 1. Numerals 21 and 21A are chain conveyors with a container supporting base which convey the vessel 22 encased with the wet explosive from the positions a to the position b through the penetration hole c provided at the partition wall 13. The chain conveyors 21, 21A are supported by the chain pulleys between 23, 23A and 24, 24A. The chain pulleys 24 and 24A are fixed on a shaft 25, and rotate together with shaft 25 to move the said chain conveyors 21 and 21A reciprocally over a definite distance. Numerals 26 and 27 are belt pulleys slidably mounted on the shaft 25. The belt pulleys 26, 27 are driven by belt pulleys 26A and 27A fixed on the driving shaft 30 by means of individual belts 28 and 29. The belt pulleys 26 and 27 turn in opposite directions by crossing the belt 29. The shaft 25 is driven in opposite directions by selective engagement of coupling clutch 31 with pulley 26 or 27 whereby there can be imparted reciprocal ascending and descending movement to the chain conveyors 21 and 21A. That is to say, when the coupling clutch 31 is coupled with the belt pulley 26, the shaft 25 rotated in the direction of the said belt pulley 26 and the chain conveyors 21 and 21A are raised whereas when the clutch is coupled with the belt pulley 27, the shaft 25 rotates in an opposite direction and the chain conveyors 21 and 21A descend. Numeral 32 is a clutch shaft, 33 a clutch change lever, and 33A a clutch lever. Numeral 34 is a cam for disengaging said coupling clutch 31 fixed to the cam shaft 35, and is designed to operate via the roller 36 provided at the lower end of said clutch 31 through the clutch lever 33A. The cam shaft 35 is driven from the shaft 25 through the chain pulleys 37 and 37A, and the chain 38. In this case, the number of revolutions of the shaft 25 necessary for moving the container 22 on the chain conveyors 21 and 21A from the point a to the point b is reduced to be about one revolution of the cam shaft 35. Therefore, when the container 22 reaches the point b and the explosive is discharged into the hopper 18, the lever 33A is actuated by means of a projection of the cam 34, and the coupling of the clutch 31 with the belt pulley 26 is automatically disengaged, whereby the ascending motion of the chain conveyors 21 and 21A is automatically stopped. As for the descending path, when the container reaches the point a, the descending motion is automatically stopped similarly by means of a cam projection at the oposite side of the cam 34. The revolution of the cam shaft 35 is transferred to the cams 42 and 42A actuating the shielding plates 47 and 47A of the shielding means 19 and 19A without any change in speed through the bevel gears 39 and 40, and the shaft 41. Numeral 43 is a lever for actuating the shielding plate which moves up and down in accordance with the profiles of the said cams 42 and 42A, and the numeral 44 is a guide for the said lever 43. Numeral 46 is a chain, one end of which is fixed to the shielding plate 47, and the other end of which is fixed to the guide 44, and is supported by the tip chain pulley 45 of the said lever 43. Therefore, when the cams 42 and 42A rotate at a same speed as that of the cam shaft 35, the cams push down the lever 43 when the container 22 passes therethrough, as the motion of the said cam is synchronized with the movement of the container 22, and the lever 43 pulls the chain 46 by means of the tip chain 45, whereby the shielding plate 47 is opened. Numeral 48 is a guide having a plurality of rollers for guiding the chain 46.

In FIGS. 7, 8 and 9, numeral 150 is a container-fixing plate, 151 a container-engaging plate, 152 an engaging rod, 153 a container-disposing base, 154 a container-engaging base, 155 a container-fixing ball, and 156 is a spring. The container 22 is inserted into the container-disposing base 153 in the direction of the arrow in FIG. 8.

The container-fixing ball 155 is supported by the spring 156, as shown in FIG. 9. When the container 22 is inserted, the sphere is pushed down against the resilient force of the spring 156, but when the container 22 is completely inserted the ball 155 projects outwardly to secure the container 22 in position.

The lower part of the container 22 has the shape as shown in FIG. 7. Accordingly, when the container 22 is inserted into the container-disposing base, the container 22 is secured by the container-fixing plates 50 at three sides and the remaining side is fixed by said ball 155. In this way, the container can never become disengaged during the transportation on the chain conveyor.

FIGS. 10 and 11 are a plan view and side view of the preliminary conveyor 2 shown in FIG. 1, and FIG. 12 is a sectional view of FIG. 10 along the line A—A. In these figures, numeral 51 is a frame for the preliminary conveyor, and is secured with the body of the vibrating conveyor, namely the drying conveyor 1 to vibrate together with the said conveyor 1. A mesh screen 52 and a plate 53 are disposed as shown in FIG. 12, to remove lumps or coarse grains of explosive. Numeral 54 is a guide trough for recovering the lumps remaining on the mesh screen 52, and 55 is a waste vessel. Accordingly, the granulated explosive discharged from the granulator 17 is screened on the mesh screen 52 by the vibration of the frame 51 fixed to the vibrating conveyor body, and is conveyed along the plate 53 toward the drying conveyor 1. In this case, the vibration of the frame 51 is designed to be larger than the vibration of the vibrating conveyor body so as to prevent the granulated explosive from adhering to the mesh screen 52. Further, a fine powder-screening mesh may be provided between the coarse screen 52 and the plate 53 so as to further remove the fine powders and completely rectify the granulated explosive discharged from the granulator 17. In this case, the fine screen is directly coupled with the drying conveyor 1, and the fine powders which have fallen on the plate 53 may be taken out of the apparatus and handled as a waste explosive in a similar way to the handling of the material remining on the coarse screen 52.

FIGS. 13, 14 and 15 are a plan view, side view, and sectional view showing the drying conveyor 1, as shown in FIG. 1, namely the vibrating conveyor main part and the cooling plate, and FIG. 16 is a sectional view showing a joint of the drying plates in the drying conveyor. In these figures, numeral 61 is a vibrating frame fixed to a base 62 through a spring 63. A plurality of the drying plates 64 are provided stagewise in a direction of the explosive movement, as shown in FIG. 16, at the said vibrating frame 61. This structure produces tumbling of the conveyed explosive granules at the joint part 10 owing to the difference in height of adjacent drying plate, to improve the drying effect. Numeral 65 is a packing, and 66 are partition plates which separate the bottom of the said drying plates 64 arbitrarily and constitute a plurality of individual hot air boxes 6. Numeral 67 is a porous plate provided in the hot air boxes 6, and 68 is the bottom plate of the hot air box 6. A blowing inlet 69 is provided in the bottom plate 68 and an exhausting outlet 70 is provided in the porous plate 67. The blowing inlet 69 and the exhausting outlet 70 are connected respectively to the air supplying duct 7 and the air exhausting duct 8 through the expansion pipes 71. The porous plates 67 serve to uniformly distribute the blown-in hot air into the hot air boxes 6. That is to say, the hot air blown in from the air supplying duct 7 is uniformly distributed in the hot air boxes by means of the porous plates 67, and exhausted into the air exhausting duct 8. A substantially uniform temperature is maintained at any part on the drying plate 64 by such circulation, and the explosive moving on the said drying plate 64 is thereby thoroughly dried. The mesh screen 4 is provided, as already described, at the end part of the drying conveyor 1 to remove the fine powders. Numeral 72 is a pipe for recovering the fine powders, and 73 is a waste vessel. The drying conveyor 1 of the present invention is always subject to a definite vibration by means of the vibrating motors 5 and 5A provided at both sides of the vibrating frame 61. The explosive is conveyed while drying at a definite speed by the said vibration from one end to the other of the drying conveyor. Accordingly, the explosive which is initially in a wet state is completely dried when it reaches the cooling plate 3, and furthermore it is in a screened state. The number of vibrations and the amplitude of the conveyor govern the conveying speed of the explosive, and they depend on the initial water content of the wet explosive, the granularity of the granulated explosive, the temperature of the drying plate, and the length of the conveyor. A vibration of 10–50 c.p.s. and an amplitude of 0.1 to 10 mm. are suitable for the ordinary initiating explosive.

FIGS. 17 and 18 are a plan view and side view respectively showing the explosive-discharging means 15 and the explosive-weighing means 16 in FIG. 1, and FIGS. 19 and 20 are front views of the explosive-discharging means and the explosive-weighing means respectively. In these figures, numeral 81 is a chain conveyor extending between chain pulleys 83 and 84. The chain conveyor 81 penetrates the partition wall 13A, and conveys the container 22A from the point E to the outlet D of the explosive-weighing means, where the explosive is encased, and returns it to the point E for subsequent removal of dried explosive. The operation is carried out successively, that is to say, the chain pulleys 83 and 83A fixed to a shaft 85, rotate together with the shaft 85 and move the said chain conveyor 81. Numerals 86 and 87 are belt pulleys slidably mounted on shaft 85 and continuously driven by the belt pulleys 88 and 89 fixed to the driving shaft 92 through the belts 90 and 91. In this case, the belt pulleys 86 and 87 are given reversed directions of rotation by crossing belt pulley 91. Thereby the shaft 85 can be driven in opposite directions of rotation by switching the coupling clutch 93 to drive the conveyor 81 with a reciprocal ascending and descending motion. In other words, the shaft 85 rotates in the direction of belt pulley 86 when the coupling clutch 93 is coupled with the belt pulley 86, and thereby the chain conveyor 81 is allowed to descend. When the coupling clutch 93 is coupled with the belt pulley 87, the shaft 85 rotates in the reverse direction and thereby the chain conveyor 81 is allowed to ascend. Numeral 94 is a clutch shaft, and 95 is a clutch change lever. Numeral 96 is a clutch lever, and 97 is a cam for disengaging the said coupling clutch 93 fixed to the cam shaft 98, and is designed to be coupled with the roller 96A provided at the bottom end of the said clutch 93 through the clutch lever 96. The said cam shaft is driven from shaft 85 through the chain pulleys 99 and 100, and the chain 101. In this case, the number of revolutions of the shaft 85 necessary for moving the container 22A on the chain conveyor 81 from the point E to the point D is reduced to about one revolution of the cam shaft 85, and thus the coupling of the clutch 93 with the belt pulley 86 is disengaged by the action of the cam 97, when the container 22A reaches the point D, and the chain conveyor 81 automatically stops its descent. Likewise, when the container 22A reaches the point E, the chain conveyor 81 automatically stops its ascent. The rotation of the cam shaft 85 is designed to be transferred to the cams 106 and 106A actuating the shielding plates 105 and 105A of the shielding means 20 through bevel gears 102 and 103 and the shaft 104, without any change in the speed. Numerals 107 and 107A are plate-actuating levers which move up and down in accordance with the profiles of the said actuating cams 106 and 106A, and are provided with chain pulleys 108 and 108A at the tips respectively. Numerals 109 and 109A are guides for the said actuating levers. Numerals 110 and 110A are chains, the ends of which are fixed to the shielding plates 105 and 105A respectively, and to the guides 109 and 109A respectively, and the chains are supported by the tip chain pulleys 108 and 108A of the said levers 107 and 107A. Accordingly, when the cams 106 and 106A rotate at the same speed as that of the cam shaft 98, the cams 106 and 106A push down the levers 107 and 107A when the container 22A passes therethrough. Since the motions of the said cams are synchronized with the movement of the container 22A on the chain conveyor 81, the levers 107 and 107A pull the chains 110 and 110A by means of the said tip chain pulleys 108 and 108A, and thereby the shielding plates 105 and 105A are individually opened. Numerals 111 and 111A are guides having a plurality of rollers for guiding the chains 110 and 110A. The explosive-discharging means thus constructed is essentially the same mechanism as that of the explosive-feeding means. However, the explosive-discharging means functions together with the explosive-weighing means, as will be described hereunder, and when a specified amount of the explosive is encased in the container 22A, the clutch 93 is designed to be automatically switched to start ascent of the chain conveyor 81. Therefore, the explosive-discharging means has, in addition, a cooperating mechanism with the said weighing means. That is to say, F is a microswitch for being closed by means of a projection of the cam 27, when the container 22A reaches the explosive-discharging outlet D; G is an adjacent switch which is actuated by means of the weight in the weighing device, when the dry explosive continuously discharged from the cooling plate 3 reaches the specified amount; H is an electromagnet which is actuated when the microswitch F and the adjacent switch G are both closed together so that the circuit is closed. Numeral 112 is a clutch to be attracted by the action of the said electromagnet H, whereby it is designed to be disengaged from the pin 114 of the rotary clutch 113. When the lever 112 is disengaged, the pin 114 is coupled with the shaft 115 which always rotates, and thereby the rotary clutch 113 is driven. Numeral 116 is a cam provided on the clutch 113, and 117 is a belt pulley which drives the shaft 115 constantly by means of the driving shaft 92. Numerals 118 and 119 are valve-actuating shafts which pull a rod 120 for actuating a pinch valve by the action of the said cam 116, to discharge the explosive into the container 22A, which stands ready for charging. On the other hand, the said cam 116 pushes the clutch lever 132 by means of a projection 131 of the cam, whereby the clutch 93 is coupled with the belt pulley 87 through the clutch lever 96, and the chain conveyor 81 is automatically driven in ascending movement. Numeral 133 is a water vat for receiving spilled explosive powders. Numeral 134 is a hopper for the explosive-weighing means which is provided under the cooling plate 3. Numeral 135 is a rubber tube fixed to the lower part of the hopper 134, and 136 is a pinch valve for clamping the said rubber tube, and is connected to the said actuating rod 120 through the lever 137. Numeral 138 is a frame for fixing the hopper 134 and the rubber tube 135. Fixing frame 138 is supported by a weighing lever 139, and guided as if it would slide by means of the guide arm 140. Numeral 141 is a support point of the said weighing lever 139 in an oil vat 142. Numeral 143 is a weight, and 144 is the projection for closing adjacent switch G. Numeral 145 is a base for vat 142. Accordingly, when a definite amount of the dry explosive continuously discharged from the cooling plate 3 is accumulated in the rubber tube 135 and exceeds the weight 143, the balance of the weighing lever 139 is disturbed. As a result, the weight 143 is elevated and the projection 144 approaches the adjacent switch G, and thereby the electric circuit is closed. In this case, when the container 22A is not at the outlet D, the microswitch F is not actuated, and thereby the electric circuit is not closed. This is to prevent the explosive from discharging when the container 22A is not at the position for its receipt. Therefore, the electric circuit is closed and the electromagnet H is in the actuated state, only when the container 22A is at the point D, the microswitch is in the actuated state by means of the cam 97, and the switch G is closed. When the electromagnet H is actuated, the clutch lever 112 is attracted, whereby it is disengaged from the pin 114 of the rotary clutch 113, and the pin 114 is coupled with the shaft 115, which constantly rotates, whereby the said rotary clutch 113 is driven. The cam 116 is thus driven in rotation and releases the pinch valve 136 through the pinch valve-actuating shafts 118 and 119, the pinch valve-actuating rod 120 and the pinch valve-actuating lever 137. Accordingly, the dry explosive accumulated in the rubber tube 135 drops into the container 22A standing ready for the filling. When the dry explosive starts to drop, the volume of the explosive retained in the hopper decreases, and the balance of weighing lever is thereby restored. The weight descends and switch G is opened, whereby the electric circuit is opened. Accordingly, the electromagnet H is deactivated and the clutch lever 112 is returned to the original position and stands ready as if the clutch pin 114 would be off. On the other hand, the pinch valve-actuating valve 120 is returned to the original position by means of the cam 116 within a definite time and closes the pinch valve 136. Accordingly, a definite amount of the explosive is constantly delivered in the container 22A. The rotary clutch 113 further rotates, and pushes the clutch lever 132 by means of the projection 131 of the cam 116, and thereby the clutch 86 is coupled with the belt pulley 87 through the clutch lever 96, the chain conveyor 81 being driven to produce ascending movement. In the explosive-discharging means of the present invention, the chain conveyor 81 is automatically switched from descending movement to ascending movement, and a definite amount of the dry explosive is continuously discharged from the cooling plate 3 is received in the container 22A and discharged out of the working room by means of the operation of the explosive-weighing means.

The apparatus for preparing the explosives which is constituted, as is described above, in the present invention carries out automatically the granulation, drying, screening, weighing and conveying of the explosive by the following operation. The container 22 filled with wet explosive is fixed to the vessel-disposing base 153 fixed to the chain conveyor 21 of the explosive-feeding means at the point $a$; when the coupling clutch 31 is coupled with the belt pulley 26 by actuating the clutch change lever 33, the shaft 25 starts to rotate due to the drive of the driving shaft 30, and the chain conveyor 21 starts to ascend by means of the chain pulleys 24 and 24A fixed to the said shaft 25. The drive of the shaft 25 is transferred to the cam shaft 35 so that the number of revolutions necessary for moving the container 22 from the point $a$ to the point $b$ may be reduced to one revolution. Therefore, when the container 22 reaches the point $b$, and discharges the explosive filled in the container 22 into the hopper 18 by turning of the container, the clutch 33 is disengaged from the belt pulley 26 through the clutch lever 33A by the action of the cam 34, whereby the chain conveyor 21 is automatically stopped. The drive of the cam shaft 35 is transferred to the cam shaft 41 at the same speed through the bevel gears 39 and 40. Further, as the motions of the cams 42 and 42A are synchronized with the movement of the container 22, the cam 42 pushes down the shielding plate-actuating lever 43, when the container 22 approaches the partition wall 13, and thereby the shielding plate is opened by means of the chain 46, when the container 22 passes therethrough. When the explosive is charged into the hopper 18, the clutch 31 is coupled with the belt pulley 27 by actuating the clutch lever 33, and the chain conveyor 21 is moved downward, whereby the empty container 22 is returned to the original position. Then, it is replaced with another container filled with the explosive, and the operation starts again. The wet explosive discharged into the hopper 18 is granulated to a suitable grain size in the granulator 17, and is allowed to drop onto the preliminary conveyor 2. The granulated explosive is screened by the coarse mesh screen of the preliminary conveyor 2. The lump and the coarse grain are recovered in the vessel 55 as waste explosive. The granulated explosive thus rectified is conveyed through the drying conveyor 1 to the cooling plate 3 by means of the vibration produced by the vibrating motor 5. During this period of conveyance, the granulated explosive is dried at the temperature of the drying plate 64 of the drying conveyor 1. That is to say, the drying plate 64 is always kept at a definite temperature by means of hot air blown in the hot air boxes 6 from the hot air-generating means 9. The granulated explosive is again screened in the fine powder mesh screen at the end of the drying conveyor 1, and the powdery explosive and fine powders are recovered in the vessel 72 as waste explosive. In this way, the explosive completely dried and rectified is continuously discharged into the hopper 134 of the explosive-weighing means 16. The dry explosive thus discharged is weighed in the explosive-weighing means and a specified amount is fed to the container 22A and removed from the working room automatically by means of the explosive-discharging means 15 with essentially the same mechanism as the said explosive-feeding means, in collaboration with the said explosive-weighing means. When the dry explosive is screened, the exhausting pipe may be provided around the mesh screen so as to prevent the powdery explosive from scattering. Furthermore, the apparatus for preparing the explosives of the present invention may be also used for drying powdery explosives other than granulated explosives by removing the granulator 17 and the fine mesh screen 4.

The present invention has improved the working efficiency in the preparation of explosives remarkably by carrying out automatically the granulation, drying, screening, weighing and conveying mainly by use of the vibrating conveyor. Furthermore, the present invention has made these operations much safer than heretofore known.

In particular, the present invention provides for the feeding and discharging of the explosives through the partition wall, so that the weighing and drying operations can be carried out in isolation in the enclosed room. Therefore, even if an accidental explosion should take place, no workers will be present since all the operations in the room are automated.

What is claimed is:

1. Apparatus for handling and treating explosive material, said apparatus comprising means defining an enclosed room including partition wall at opposite ends of said room, each said partition walls having an opening therein, displaceable shielding plates on said partition walls covering said openings, first conveyor means extending through the opening of one partition wall, container means mounted on the conveyor means and adapted for containing explosive material, drive means for driving the conveyor means in reciprocation to introduce the container means into the room and to remove the container means from the room, means coupling the shielding plates of said one wall and the drive means to open said opening in said one partition wall only when the container means is to pass therethrough, means in said room for removing the explosive material from said container means, a vibrating drying conveyor positioned adjacent the latter means for receiving the removed explosive material therefrom, the explosive material being advanced along the drying conveyor by the vibration thereof, means for heating the drying conveyor to dry the explosive material thereon, weighing means adjacent the drying conveyor to continuously receive dried explosive material therefrom and to accumulate and discharge a prescribed quantity of material, discharge conveyor means extending through the opening of the other partition wall, second container means mounted on the latter conveyor means for receiving said prescribed quantity of material from the weighing means, means for driving the discharge conveyor means in reciprocation to remove the second container means from the room and for introducing it into said room, and means coupling the shielding plates of the other wall with said discharge conveyor means to open said opening in the other partition wall only when the second container means is to pass therethrough.

2. Apparatus as claimed in claim 1 wherein said first conveyor means comprises a conveyor which is driven in reciprocation to move said first container means between end positions, said drive means for the first conveyor means comprising a shaft for driving said conveyor, first and second elements driven in opposite directions of rotation, clutch means for alternately engaging said first and second elements with said shaft, and a cam driven by said shaft and operating said clutch means such that one rotation of said shaft produces movement of the first container means between said end positions.

3. Apparatus as claimed in claim 2 wherein said means coupling the shielding plates of said one wall and the drive means for said first conveyor means comprises an actuating lever for the latter said shielding plates driven by said cam to obtain synchronized movement of the shielding plates and the first conveyor means.

4. Apparatus as claimed in claim 1 comprising means for controlling the discharge of the prescribed quantity of material from the weighing means comprising first switch means which is closed when the prescribed quantity of material is accumulated by the weighing means, second switch means which is closed when the second container means is positioned to receive the accumulated material from the weighing means and electromagnet means which is activated when both switch means are closed to enable discharge of the accumulated material from the weighing means into said second container means.

5. Apparatus as claimed in claim 1, wherein said vibrating conveyor comprises a vibrating frame including a plurality of inclined drying plates arranged stepwise in the direction of conveying movement, said plates being divided to form a plurality of mutually independent hot air boxes, each including a bottom plate having a hot air blowing inlet and a porous plate having a hot air exhausting outlet so that the drying plates are heated.

6. Apparatus as claimed in claim 1 comprising a preliminary conveyor in said room coupled to said vibrating conveyor, a hopper in said room for receiving explosive material from said first conveyor means, a granulator beneath said hopper for receiving explosive material therefrom and for granulating the material and feeding the same to said preliminary conveyor, said preliminary conveyor comprising a coarse mesh screen beneath the granulator and a plate beneath said screen which feeds screened material to the vibrating conveyor, means coupled to the vibrating conveyor for screening the dried explosive material to separate material of fine powder size therefrom and for conveying the remainder to the weighing means, and means for collecting the separated fine powder from the latter means and the coarse material from said coarse screen.

7. Apparatus as claimed in claim 6 comprising exhausting means adjacent said means for screening the dried explosive for removing scattered material of fine powder size.

8. A method for handling and treating explosive material comprising introducing wet explosive material into an enclosure through an opening which is normally closed and is opened only to permit passage of the explosive material into said enclosure, drying the explosive material in said enclosure while conveying the material by vibration through a zone indirectly heated by hot air, weighing the thus dried explosive material, and discharging a particular weight of material from said enclosure through a second opening which is also normally closed and is opened only for the passage of the explosive material from said enclosure.

9. A method as claimed in claim 8 comprising granulating the explosive material within said enclosure, screening the material in the enclosure, and withdrawing the undesired screened material from the enclosure.

10. A method as claimed in claim 8 comprising screening the thus dried material within the enclosure to separate material of undesired size and withdrawing the latter material from the enclosure.

No references cited.

BENJAMIN A. BORCHELT, *Primary Examiner.*

P. A. SHANLEY, *Assistant Examiner.*